Patented Aug. 29, 1944

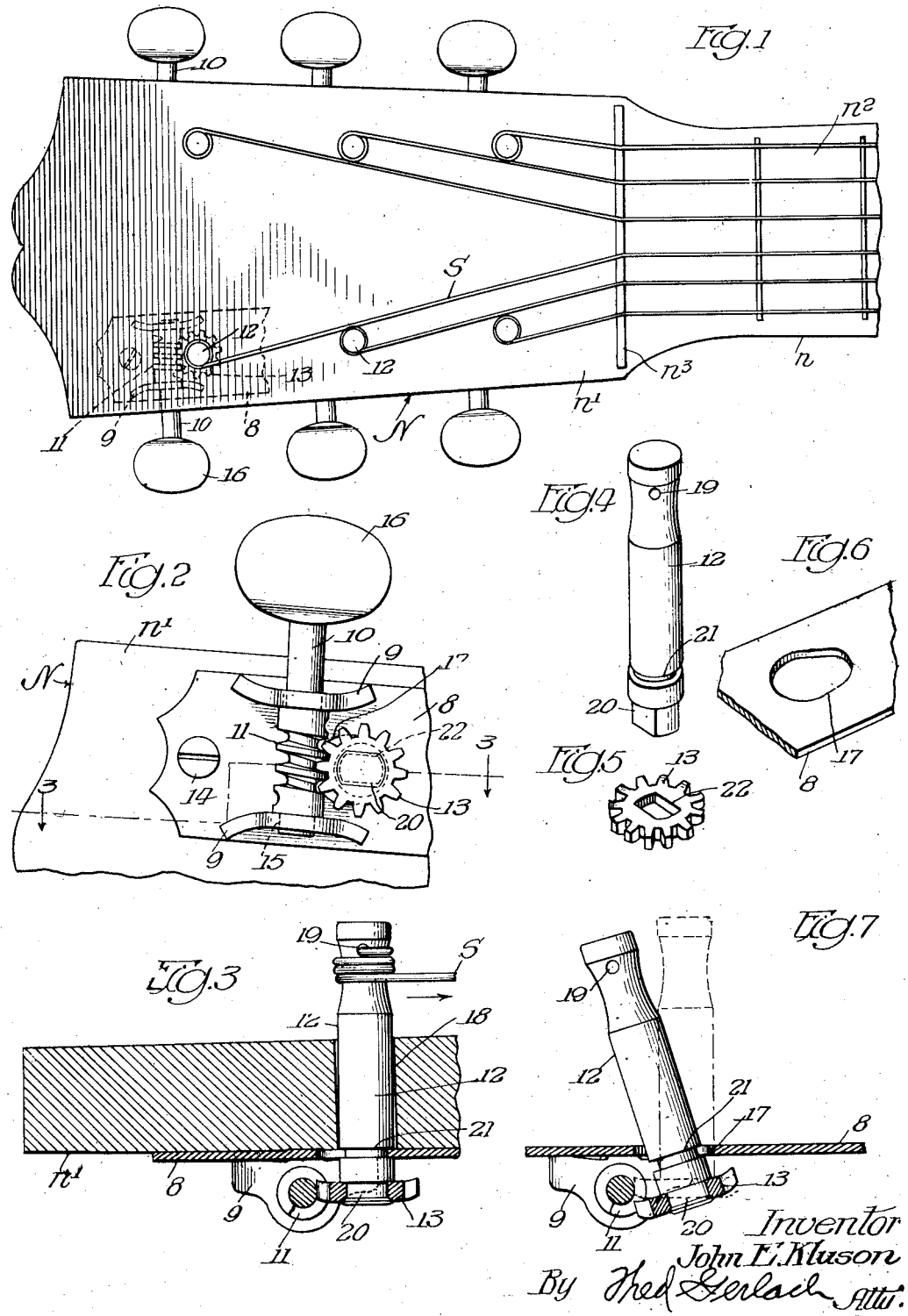

2,356,766

UNITED STATES PATENT OFFICE 2,356,766

TUNING HEAD FOR STRINGED INSTRUMENTS

John E. Kluson, Chicago, Ill.

Application April 10, 1943, Serial No. 482,542

1 Claim. (Cl. 84—306)

The present invention relates generally to tuning heads for stringed instruments such, for example, as guitars, mandolins, and banjos. More particularly the invention relates to that type of tuning head which is mounted on the outer end of the neck of the instrument with which it is used and with its parts comprises a mounting plate with a hole therein, a pair of laterally spaced plate metal brackets which are mounted on the plate adjacent the hole and have aligned bearing forming holes therein, a shaft which extends through, and is journaled in, the holes in the brackets and has a key for turning purposes at its outer end and a worm on the portion thereof between the brackets, a spindle which extends through the hole in the mounting plate and embodies a string anchoring aperture in the end thereof that is remote from the brackets, and a worm wheel which is mounted on the other end of the spindle, meshes with the worm, and forms with the latter a driving connection whereby the spindle may be rotated for string tuning purposes by turning of the shaft by way of the key.

In connection with a tuning head of this type it has heretofore been customary to employ a worm gear of full or standard thickness and with a polygonal open ended socket in its central portion, and to secure the gear on the polygonal lug at the gear carrying end of the spindle by way of a screw, the head of which overlies the outer end face of the gear and the shank of which extends into an internally threaded hole in the lug. In addition it has been customary to have the inner end face of the worm gear bear against or engage the hole defining portion of the mounting plate so as to limit axial movement of the spindle in one direction relatively to the plate. In practice it has been found that a tuning head as heretofore designed or constructed is subject to certain objections. In the first place, installation or assembly of the worm gear and spindle with respect to the other parts of the head requires both time and skill because it is necessary first to place the worm gear while disconnected from the spindle against the worm and position it so that the polygonal socket therein is in alignment with the hole in the plate, then to insert the lug equipped end of the spindle through the hole in the plate and turn or otherwise manipulate the spindle in order to bring the lug into seated or interfitting relation with the socket in the worm gear, and then to apply and tighten the screw. Secondly, the worm gear, because of its full or standard thickness and the fact that it engages the hole defining portion of the mounting plate, sometimes binds and interferes with or prevents turning of the spindle when a turning force is exerted on the key in connection with a tuning operation. Thirdly, the screw for securing the worm gear in place on the polygonal lug at the gear carrying end of the spindle is likely to work itself loose and if loosened results in release of the worm gear and separation of the latter from the worm on the key equipped shaft.

The primary object of the invention is to provide a tuning head which is an improvement upon, and eliminates the objectionable points or features of, previously designed tuning heads in that (1) the worm gear and spindle may be quickly and readily mounted in assembled relation with the other parts of the head while they are in connected relation; (2) the worm gear is so arranged and designed that it neither binds nor interferes with or prevents turning of the spindle when a turning force is exerted on the key in connection with a tuning operation; and (3) the worm gear is permanently connected to the gear carrying end of the spindle and hence there is no likelihood of the gear becoming displaced from the worm so long as the spindle is in its operative position.

Another object of the invention is to provide a tuning head in which the worm gear and spindle are so designed or arranged that when the head is in its operative position the gear is firmly in mesh with the worm and backlash is hence effectively eliminated.

A further object of the invention is to provide a tuning head of the type and character under consideration in which the worm gear is at all times out of engagement with the mounting plate and the spindle is provided with an annular groove which is spaced from the worm gear, receives a portion of the hole defining portion of the mounting plate, and coacts with such portion to preclude axial displacement of the spindle in either direction relatively to the mounting plate.

A still further object of the invention is to provide a tuning head which is generally of new and improved construction and is characterized by simplicity of design and the fact that it may be produced or fabricated at an extremely low cost.

Other objects of the invention and the various advantages and characteristics of the present tuning head will be apparent from a consideration of the following detailed description.

The invention consists in the several novel features which are hereinafter set forth and are more particularly defined by the claim at the conclusion hereof.

In the drawing which accompanies and forms a part of this specification or disclosure and in which like letters and numerals of reference denote corresponding parts throughout the several views:

Figure 1 is a plan view of the neck of a stringed instrument to which is applied a tuning head embodying the invention;

Figure 2 is a bottom or inverted plan view of the tuning head;

Figure 3 is a vertical section taken on the line 3—3 of Figure 2 and illustrating in detail the arrangement and design of the worm gear and spindle;

Figure 4 is a perspective showing the spindle before application of the worm gear to the polygonal lug on the gear carrying end thereof;

Figure 5 is a perspecive of the worm gear;

Figure 6 is a fragmentary perspective of the mounting plate showing in detail the shaft and design of the spindle receiving hole therein; and Figure 7 is a section illustrating the manner in which the worm gear and spindle are assembled with respect to the other parts of the tuning head prior to mounting of the mounting plate on the neck of the instrument.

The tuning head which is shown in the drawing constitutes the preferred form or embodiment of the invention. It is adapted for use with a stringed instrument having a neck N and comprises as the main or essential parts thereof a mounting plate 8, a pair of brackets 9, a shaft 10, a worm 11, a spindle 12 and a worm gear 13. The neck N is of the type that is used in connection with a guitar and embodies a shank part $n$ at its inner end and a head part $n^1$ at its outer end. These two parts are suitably joined together or formed integrally with one another, as shown in Figure 1. The shank part $n$ embodies a fretted finger board $n^2$ on its top face. An extension nut $n^3$ is located at the outer end of the finger board. It extends transversely across the neck N and is located at the juncture of the shank and head parts $n$ and $n^1$. A string S is disposed above, and extends lengthwise of, the neck. This string is supported in spaced relation with the finger board $n^2$ by the nut $n^3$.

The mounting plate 8 is in the form of an elongated metallic stamping. It fits flatly against the bottom face of the head part $n^1$ of the neck N and embodies a hole at its outer end. A screw 14 extends through this hole and into the head part of the neck and serves to secure the mounting plate in connected relation with said head part.

The brackets 9 are stamped from plate metal and depend from the side portions of the mounting plate 8. They are positioned in laterally spaced or opposed relation and have circular holes 15 in their central portions. Such holes, as shown in Figure 2, are coaxial and form bearings for the shaft 10. The brackets 9 are fixedly secured to the mounting plate 8 in any suitable manner and are preferably like those which are shown in United States Letters Patent No. 2,132,792, granted to me on October 11, 1938.

The shaft 10 extends through, and is journaled in, the bearing forming holes 15 in the central portions of the brackets 9 and is arranged so that one end thereof projects outwards of the mounting plate 8 and beyond the adjacent or side margin of the head part $n^1$ of the neck N. A key 16 is fixedly secured to the outer or projecting end of the shaft 10 and is adapted to be gripped in connection with turning of the shaft for string tuning purposes. The inner end of the shaft, i. e., the portion that is disposed between the brackets 9, carries the worm 11. The latter is preferably formed integrally with the shaft 10 and is of such length that the ends thereof abut against the central portions of the brackets 9 and coact therewith to hold the shaft 10 against axial displacement in either direction relatively to the brackets.

The spindle 12 extends at right angles to the key equipped shaft 10 and projects through a hole 17 in the mounting plate 8 and a hole 18 in the head part $n^1$ of the neck N. The upper end of the spindle projects above the top face of the head part of the neck, as shown in Figure 3, and embodies a transverse aperture 19. The latter serves as an anchoring medium for the neck or outer end of the string S. The hole 18 in the head part $n^1$ of the neck is cylindrical. It is preferably of slightly greater diameter than the central portion of the spindle so that the spindle is permitted to tilt to a limited extent. The spindle 12 is located at one side of the worm 11, as shown in Figures 2 and 3, and is positioned between the shaft 10 and the extension nut $n^3$. The lower end of the spindle projects downwards beyond the bottom face of the mounting plate and is provided with a reduced polygonal lug 20. The latter, as shown in Figure 3, is aligned with the worm 11. The portion of the spindle that extends through the hole 17 in the mounting plate is provided with an annular groove 21. The hole 17 is oval or pear shaped (see Figure 6) and is arranged so that the large end thereof extends in the direction of the shaft 10. Such large end of the hole 17 is laterally offset with respect to the lower end of the hole 18 in the head part $n^1$ of the neck N and is substantially three-quarters round. It is of slightly larger diameter than the spindle and is adapted to have the spindle inserted through it in connection with mounting of the spindle with respect to the mounting plate 8. The small or other end of the hole 17 is semi-circular and corresponds in diameter to the grooved portion of the spindle. After the spindle is inserted through the large end of the hole 17 in connection with mounting thereof with respect to the mounting plate it is shifted laterally away from the key equipped shaft 10 in order to bring the grooved portion thereof into seated or interfitting relation with the portion of the mounting plate that defines the small end of the hole. As shown in Figure 3, the width of the groove corresponds to the thickness of the mounting plate 8. When the spindle is in place the grooved portion thereof coacts with the portion of the mounting plate that defines the small end of the hole 17 to prevent longitudinal or axial displacement of the spindle with respect to the mounting plate. The small end of the hole is of less diameter than the hole 18 in the head part $n^1$ of the neck N and is positioned in concentric relation with the hole 18, as shown in Figure 3. As a result of this the portion of the mounting plate that defines the small end of the hole projects inwards of the lower end of the hole 18. The small end of the hole constitutes a half round or semi-circular bearing in which the grooved portion of the spindle is journaled when the spindle is in its operative position. Except for the groove and the polygonal lug 20 the central and lower end portions of the spindle are of uniform diameter. When the spindle is in its operative position the portion of the head part $n^1$ of the neck N that defines the hole 18 holds the spindle so that the grooved portion thereof is in interfitting relation with the portion of the mounting plate that defines the small end of the hole 17 and prevents the spindle from being shifted laterally in the direction of the key equipped shaft 10. The groove 21 is spaced from the lower end face of the spindle a distance corresponding substantially to the distance of the key equipped shaft 10 from the bottom face of the mounting plate 8.

The worm gear 13 is stamped from plate metal and has in the central portion thereof a polygonal open ended socket 22 which corresponds in shape to the polygonal lug 20 on the lower end of the spindle 12. The lug 20 extends through the socket 22 and has the lower or outer end thereof riveted or beaded over in order permanently to secure the worm gear 13 to the lower end of the spindle 12. The riveted or beaded over lower end of the lug 20 serves to clamp the central portion of the worm gear 13 against the lower end face of the spindle. The worm gear is carried by the spindle so that it meshes with the worm 11 and forms a driving connection whereby the spindle may be rotated in response to turning of the shaft 10 by way of the key 16. When the spindle is rotated in one direction as the result of turning of the shaft by the key 16 it operates to tighten the string S by winding it around the upper projecting end of the spindle. When the spindle is reversely rotated as the result of reverse turning or manipulation of the key 16 the string is unwound from the spindle and its tension is thus lessened. By turning of the key 16 in one directed or the other tuning of the string S may be effected. The thickness or worm gear 13 is approximately one-half the thickness of the diameter of the worm 11. Because of this and the fact that the worm gear is spaced from the bottom face of the mounting plate there is no binding of the gear when the key equipped shaft 10 is turned in one direction or the other in connection with a tuning operation. The portion of the mounting plate that defines the small end of the hole 17 is so positioned or arranged that when the grooved portion of the spindle is in interfitting relation with it the teeth on the worm gear 13 are in meshing and centered relation with the teeth of the worm 11.

The spindle and worm gear are adapted when the mounting plate 8 is disconnected from the head part of the neck N to be mounted in assembled relation with the other parts of the tuning head as a unit. In assembling the assembly of spindle and worm gear the upper or apertured end of the spindle is inserted through the large end of the hole 17 in the mounting plate and the spindle is shifted upwards until the grooved portion thereof is in substantial alignment with the small end of said hole 17. Because of the position or arrangement of the large end of the hole with respect to the worm 11 it is necessary to insert the spindle in a tilted manner through the large end of the hole, as shown in Figure 7. When the grooved portion of the spindle is in substantial alignment with the small end of the hole 17 in the mounting plate the spindle is tilted into a position wherein it extends normal or at right angles to the mounting plate. Such tilting on the part of the spindle automatically operates to bring the worm gear 17 into meshing relation with the worm 11 and also causes the grooved portion of the spindle to shift into interfitting relation with the portion of the mounting plate that defines the small end of the hole. After the assembly of spindle and worm gear has been mounted in place with respect to the mounting plate and the other parts of the tuning head the upper end of the spindle is inserted into the lower end of the hole 18 in the head part $n^1$ of the neck N and the mounting plate is then shifted upwards until it fits flatly against the bottom face of the head part $n$. This results in proper arrangement of the spindle with respect to the head part $n^1$ of the neck N. When the mounting plate is in place it is fixed to the head part by way of the screw 14. The screw serves to hold the mounting plate so that the hole 17 is positioned with respect to the hole 18 as shown in Figure 3. When the mounting plate is in place and the spindle is turned so as to place the string S under tension the spindle tilts to a slight extent or degree in the direction of the arrow in Figure 3. Such tilting is attributable to the fact that the hole 18 is of slightly greater diameter than the central portion of the spindle. As soon as the string S is placed under tension by proper turning of the spindle so as to effect tightening of the string, the spindle fulcrums about the portion of the mounting plate that defines the small end of the hole 17 with the result that the lower end of the spindle swings in the direction of the shaft 10 and brings the worm gear 13 into firm engagement or abutment with the worm 11. By having the worm gear in firm abutment with the worm backlash is effectively eliminated.

The herein described tuning head is characterized by the fact that there is no backlash between the worm gear and the worm and the worm gear is not subject to binding. It is further characterized by the fact that the assembly of spindle and worm gear may be installed or mounted with respect to the other parts of the tuning head in a simple and expeditious manner. By having the worm gear permanently connected to the spindle there is no possibility of the gear being displaced from the worm when the tuning head is in its operative position. Because of the design and arrangement of the worm gear and spindle the tuning head is capable of being produced at an extremely low cost.

Whereas but a single tuning head has been described in connection with the neck N it is to be understood that the head is adapted for use in connection with other tuning heads of like design. It is also to be understood that the invention is not to be restricted to the details set forth since these may be modified within the scope of the appended claim without departing from the spirit and scope of the invention.

Having thus described the invention what I claim as new and desire to secure by Letters Patent is:

A tuning head adapted for use on a musical instrument neck having a cylindrical hole therethrough, and comprising a mounting plate fitting and secured against one side of the neck and having formed therein a gear shaped hole the small end of which faces toward the inner end of the neck and is in concentric relation with, but of less dameter than, the hole in the neck, and the large end of which faces the outer end of the neck, is of approximately the same diameter as the hole in the neck, and is partially offset with respect to the last mentioned hole, a rotatable worm mounted adjacent the outer face of, and in parallel relation with, the plate, positioned across the large end of the hole in the plate and provided with turning means, a spindle of slightly less diameter than the hole in the neck and provided therein with an annular groove the diameter of which approximates the diameter of the small end of the hole in the plate, adapted to be inserted through the large end of the hole in connection with assembly of the head and while the mounting plate is disconnected from the neck and then when the groove is in registry with the hole in the plate to be shifted laterally into an operative position wherein it extends at right angles to the plate and worm and the groove is in seated relation with the portion of the mounting plate that defines the small end of the hole, and further adapted after being shifted into its operative position and while mounted on the plate on the neck to fit loosely in the hole in the neck, and having one end thereof projecting beyond the side of the neck that is opposite the mounting plate and provided with means for anchoring one end of a string and its other end projecting outwards of the plate, and a flat stamped metal worm gear having a thickness corresponding to approximately half the diameter of the worm, mounted permanently on said other end of the spindle and arranged so that when the spindle is in its operative position it is spaced from the plate and is in meshing and centered relation with the worm.

JOHN E. KLUSON.